US010041235B2

United States Patent
Stein

(10) Patent No.: US 10,041,235 B2
(45) Date of Patent: Aug. 7, 2018

(54) SANITARY OUTLET ELEMENT

(71) Applicant: Neoperl GmbH, Mullheim (DE)

(72) Inventor: Alexander Stein, Ihringen (DE)

(73) Assignee: NEOPERL GMBH, Mullheim (DE)

(*) Notice: Subject to any disclaimer, the term of this patent is extended or adjusted under 35 U.S.C. 154(b) by 0 days.

(21) Appl. No.: 15/007,613

(22) Filed: Jan. 27, 2016

(65) Prior Publication Data

US 2016/0222639 A1    Aug. 4, 2016

(30) Foreign Application Priority Data

Feb. 3, 2015  (DE) .................... 20 2015 000 856 U

(51) Int. Cl.
| | | |
|---|---|---|
| E03C 1/08 | (2006.01) | |
| E03C 1/086 | (2006.01) | |
| E03C 1/084 | (2006.01) | |
| G05D 7/01 | (2006.01) | |
| E03C 1/02 | (2006.01) | |

(52) U.S. Cl.
CPC .............. *E03C 1/086* (2013.01); *E03C 1/084* (2013.01); *E03C 2001/026* (2013.01); *G05D 7/012* (2013.01)

(58) Field of Classification Search
CPC .......... E03C 1/086; E03C 1/084; G05D 7/012
USPC ..................................................... 239/428.5
See application file for complete search history.

(56) References Cited

U.S. PATENT DOCUMENTS

| | | | | |
|---|---|---|---|---|
| 3,847,178 | A | * | 11/1974 | Keppel .................... F16K 1/36 137/515.7 |
| 4,562,960 | A | | 1/1986 | Marty et al. |
| 5,348,231 | A | | 9/1994 | Arnold et al. |
| 8,402,995 | B2 | | 3/2013 | Zoller |
| 9,249,564 | B2 | * | 2/2016 | Zoller .................... E03C 1/084 |
| 2013/0068860 | A1 | | 3/2013 | Tempel |
| 2013/0175366 | A1 | | 7/2013 | Zoller et al. |
| 2014/0217202 | A1 | | 8/2014 | Stein et al. |

FOREIGN PATENT DOCUMENTS

| | | |
|---|---|---|
| DE | 20104948 | 5/2001 |
| DE | 102007010618 | 11/2008 |
| DE | 202010016867 | 11/2011 |
| EP | 1933217 | 6/2008 |
| EP | 2762234 | 8/2014 |
| WO | 2012156435 | 11/2012 |

* cited by examiner

*Primary Examiner* — Jason Boeckmann
(74) *Attorney, Agent, or Firm* — Volpe and Koenig, P.C.

(57) ABSTRACT

A sanitary outlet element is provided which is insertable, via its insert housing, into the water outlet of a sanitary outlet fitting and has a jet regulator for shaping the exiting water jet, a throughflow-quantity regulator or a throughflow restrictor is arranged in front of the jet regulator, on the inflow side, by which the quantity of water flowing through per unit of time is adjusted, or limited, to a set value. The throughflow-quantity regulator or restrictor is guided in a displaceable manner in the insert housing by the flow-restrictor or regulator housing and is movable, counter to the restoring force of at least one restoring element, from an open position, in which the flow-restrictor or regulator housing has at least some of the water flowing around it, into a closed position, in which the water flowing to the jet regulator flows through the throughflow-quantity regulator or the throughflow restrictor.

16 Claims, 2 Drawing Sheets

SANITARY OUTLET ELEMENT

INCORPORATION BY REFERENCE

The following documents are incorporated herein by reference as if fully set forth: German Patent Application No. DE 202015000856.9, filed Feb. 3, 2015.

BACKGROUND

The invention relates to a sanitary outlet element which can be inserted, by way of its insert housing, into the water outlet of a sanitary outlet fitting and has a jet regulator for shaping the exiting water jet, there being arranged in front of the jet regulator, as seen on the inflow side, a throughflow-quantity regulator or a throughflow restrictor, by means of which the quantity of water flowing per unit of time is adjusted, or limited, to a set value.

A wide variety of different designs of sanitary outlet elements arranged in a water line are already known. Therefore, jet regulators which can be inserted into the water outlet of a sanitary outlet fitting are already available. The previously known jet regulators, which can either be fastened directly in the water outlet of a sanitary outlet fitting or can be inserted into an outlet mouthpiece, which can be installed in the water outlet, usually have a jet divider, by which the water stream flowing in through the water line and the fitting body is subdivided into a multiplicity of individual jets. These individual jets, depending on the jet-regulator design, can be aerated, as required, before, in a homogenizing device downstream of the jet divider and/or in an outflow-side flow straightener having a mesh-like, lattice-like, screen-like or honeycomb-like structure, a homogeneous, soft and non-splashing water jet is formed at the water outlet.

In order for the jet regulator to function optimally and shape the water jet exiting from the water outlet, it is necessary to have a certain quantity of water flowing through the jet regulator. Since the jet regulator, and possibly also the downstream functional units of the jet regulator, form/forms a flow obstruction, there is a risk, at low pressures, of the quantity of water flowing through the jet regulator being insufficient, and the jet regulator not being able to perform its function, and of the water jet exiting from the jet regulator being felt to be uncomfortable.

U.S. Pat. No. 4,562,960 describes a sanitary outlet element which has a jet aerator, which has a throughflow-quantity regulator arranged before it, as seen in the flow direction. While the throughflow-quantity regulator has the task of adjusting the throughflowing water to a fixed maximum throughflow output, irrespective of pressure, the downstream jet aerator, as seen in the flow direction, is intended to form a homogeneous, effervescent-soft and non-splashing water jet. The throughflow-quantity regulator of the outlet element previously known from U.S. Pat. No. 4,562,960 has an annular flow-restricting body, which is made of an elastic material and delimits, between itself and an inner regulating body, a control gap which, as the pressure of the through-flowing water increases, narrows to an increasing extent such that, even as the pressure of the throughflowing water increases, a set maximum throughflow output is not exceeded. The water coming from the throughflow-quantity regulator of the previously known outlet element then flows through the downstream jet aerator, as seen in the flow direction. Said jet aerator has a jet divider, which divides up the inflowing water stream into a multiplicity of individual jets. The jet divider generating the separated water jets here constitutes a narrowing of the throughflow cross section, in which cross-sectional narrowing the individual jets generated experience acceleration such that a negative pressure arises on the outflow side of the jet divider, ambient air being sucked into the jet-regulator housing with the aid of said negative pressure, and the ambient air then being mixed with the individual jets before the individual jets aerated in this way are brought together again, in an outflow-side flow straightener, to form a homogeneous overall jet.

The throughflow-quantity regulator provided in the previously known outlet element does not mix a certain additional quantity of water in with a basic output of the outlet element at low water pressures, in order for this additional quantity of water to be fully suppressed at high throughflow outputs; rather, the previously known throughflow-quantity regulator merely adjusts the throughflow output to a set maximum value.

SUMMARY

There is therefore particularly the object of providing a sanitary outlet element of the type mentioned in the introduction which always provides an optimum throughflow cross section both in low pressure ranges and in high pressure ranges.

This object is achieved according to the invention, in the case of the sanitary outlet element of the type mentioned in the introduction, in particular in that the throughflow-quantity regulator or the throughflow restrictor is guided in a displaceable manner in the insert housing by way of the flow-restrictor housing or regulator housing and can be moved, counter to the restoring force of at least one restoring element, from an open position, in which the flow-restrictor housing or regulator housing has at least some of the water flowing around it, into a closed position, in which the water flowing to the jet regulator flows through the throughflow-quantity regulator or the throughflow restrictor.

The outlet element according to the invention has an insert housing, which can be inserted into the water outlet of a sanitary water-outlet fitting. The outlet element has a jet regulator, by means of which the water exiting from the outlet element can be shaped into a homogeneous and, as far as possible, non-splashing water jet. This jet regulator has arranged in front of it a throughflow-quantity regulator or a throughflow restrictor, by which the quantity of water flowing through per unit of time is adjusted to a set value. This throughflow-quantity regulator or this throughflow restrictor is guided in a displaceable manner in the insert housing by way of the flow-restrictor housing or regulator housing and can be moved, counter to the restoring force of at least one restoring element, from an open position, in which the flow-restrictor housing or regulator housing has at least some of the water which flows through the outlet element flowing around it along its outer side, into a closed position. In this closed position, the water flowing through the flow-restrictor housing or regulator housing of the outlet element to the jet regulator can flow through just the throughflow-quantity regulator or the throughflow restrictor. Whereas it is therefore the case, in the open position, that the water pressure has not yet reached a level at which, on the one hand, the restoring force of the at least one restoring element is overcome and, on the other hand, the throughflow-quantity regulator or the throughflow restrictor has the task of adjusting down, or limiting, the throughflow output to the set value, it is the case at a higher water pressure that the throughflow-quantity regulator or the throughflow restrictor moves into the closed position, in which the water can pass just through the throughflow-quantity regulator or the throughflow restrictor such that the throughflow-quantity regulator or the throughflow restrictor can adjust the exiting quantity of water in a functionally appropriate manner to the set maximum value. Since, by selection of a suitable restoring element with a fixed restoring force, it is also possible to set the water pressure at which the throughflow-quantity regulator or the throughflow restrictor is intended to operate in a functionally appropriate manner in the closed position, the outlet element according to the invention can be adjusted particularly well and easily and is distinguished by functionally reliable and stable operation.

It is basically possible for the outlet element according to the invention to use any throughflow-quantity regulator which can reliably adjust the desired maximum throughflow output. A preferred embodiment, however, is one in which the throughflow-quantity regulator has an annular flow-restricting element which is made of elastic material, is arranged in an annular groove in the regulator housing and engages around a housing core, in which at least one of the circumferential walls delimiting the annular groove bears a regulating profiling, and in which the regulator housing, in the region of the groove floor, has at least one throughflow opening. Such throughflow-quantity regulators are of a simple design and easy to produce and have proven successful.

Provision is made here for the throughflow-quantity regulator to delimit, between itself and the at least one circumferential wall bearing the regulating profiling, an annular gap, and for the flow-restricting body, as the pressure of the water flowing through increases, to embed itself into the regulating profiling such that the annular gap narrows to an increasing extent. The water flowing through the outlet element has to pass through the annular gap provided between the flow-restricting body and the regulating profiling. As the water pressure increases, it is also the case that the elastic flow-restricting body embeds itself to an increasing extent into the regulating profiling such that the annular gap narrows in such a way that, irrespective of the water pressure, a set maximum value of the throughflow output is not exceeded.

So that the water flowing through the outlet element, in the closed position, has to flow solely through the throughflow-quantity regulator or the throughflow restrictor, and can be adjusted, or limited, there without there being any risk of significant rogue streams flowing past the throughflow-quantity regulator or past the throughflow restrictor, provision is made, in the closed position, for the throughflow-quantity regulator or the throughflow restrictor to rest, by way of its flow-restrictor housing or regulator housing, on a support such that a support opening is closed.

In order to ensure functionally appropriate operation of the throughflow-quantity regulator in the closed position, it is advantageous if, in the closed position, the at least one throughflow opening of the throughflow-quantity regulator opens out in the support opening.

In order for it to be possible, in addition, to rule out, in the closed position, rogue streams flowing past the throughflow-quantity regulator or past the throughflow restrictor, and in order for the flow-restrictor housing or regulator housing to be positioned in a sealed manner on the support in the closed position, it is expedient if at least one annular seal is provided between the flow-restrictor housing or regulator housing and the support.

A preferred embodiment according to the invention here provides for at least one annular seal to be integrally formed on the regulator housing or on that peripheral region of the support which surrounds the support opening.

The water flowing through the outlet element can be shaped to particularly good effect by the jet regulator if the jet regulator, in the customary manner, has a jet divider, by which the water flowing through is divided up into a multiplicity of individual jets.

A preferred embodiment according to the invention here is one in which the jet divider is designed in the form of an approximately cup-like diffuser which, in the circumferential wall of its cup shape, has divider openings, by means of which the water flowing through is divided into a multiplicity of individual jets.

In order to displace the throughflow-quantity regulator or the throughflow restrictor in a reliable manner between the closed position and the open position, it is expedient if a guide pin projects on the cup base of the cup-like diffuser and passes through a guide opening in the flow-restrictor housing or regulator housing.

This guide opening is preferably arranged approximately coaxially in relation to the longitudinal axis of the flow-restrictor housing or regulator housing. A preferred embodiment according to the invention therefore provides, in the case of a throughflow-quantity regulator, for the guide opening to pass through the core of the regulator housing.

So that, in the closed position, the water flowing through the outlet element flows solely through the throughflow-quantity regulator or the throughflow restrictor, and can be adjusted, or limited, thereby to a set value, it is advantageous if the diffuser, on its inflow-side inner circumference, has a support mount, on which the support rests, and if the support mount is designed preferably in the form of an annular shoulder.

A preferred embodiment according to the invention here provides for the support to be designed in the form of an annular disc.

A development according to the invention provides for the guide pin, at its free pin end, to bear resilient arms, for sliding stops for the flow-restrictor housing or regulator housing to be provided on the outside of the resilient arms, and for the resilient arms to be deflected, or moved resiliently, inwards in relation to one another, counter to their inherent elasticity, from a functional position into a release position. In the case of this embodiment, the guide pin has resilient arms at its free end. Sliding stops for the flow-restrictor housing or regulator housing are provided on the outside of the resilient arms and delimit the sliding path of the flow-restrictor housing or regulator housing in the direction away from the diffuser. So that the flow-restrictor housing or regulator housing can be pushed onto the resilient arms and the guide pins via the sliding stops, the resilient arms can be deflected, or moved resiliently, inwards in relation to one another, counter to their inherent elasticity, from a functional position into a release position.

It is particularly advantageous here, if the outlet element has an attachment screen or filter screen, if the attachment screen or filter screen is fastened preferably in a releasable manner on the insert housing, and if the throughflow-quantity regulator or the throughflow restrictor is arranged, and guided in a displaceable manner, in the insert housing between the jet divider and the attachment screen or filter screen.

Even in the case of the throughflow-quantity regulator or the throughflow restrictor being subjected to a comparatively high restoring force by the restoring element, there is no risk of the restoring element displacing the throughflow-quantity regulator or the throughflow restrictor in an uncontrolled manner beyond the guide pin in the direction of the attachment screen or filter screen if the attachment screen or filter screen has provided on it a securing pin which, with the attachment screen or filter screen latched on the flow-restrictor housing or regulator housing, projects into a free space remaining between the resilient arms such that the resilient arms are secured in their functional position. If, in the case of this embodiment, the attachment screen or filter screen is latched on the flow-restrictor housing or regulator housing, a securing pin on the attachment screen or filter screen projects into a free space remaining between the resilient arms such that the resilient arms are prevented from being deflected, or moved resiliently, inwards towards one another.

A particularly simple and preferred embodiment according to the invention provides for the at least one restoring element to be a restoring spring or compression spring.

A preferred development according to the invention provides for the cup base of the diffuser and the flow-restrictor housing or regulator housing to have provided between them a damping ring, the guide pin passing through the annular opening of said damping ring, and for the damping ring to delimit the sliding path of the flow-restrictor housing or regulator housing in the direction of the jet divider. This damping ring engages around the guide pin in its sub-region directed toward the diffuser. The damping ring can serve as a stop damper for the throughflow-quantity regulator guided in a displaceable manner on the guide pin, or for the throughflow restrictor guided in a displaceable manner there; at the same time, it is also possible, however, for the damping ring to close an annular gap remaining between the guide pin and the guide opening on the housing core of the flow-restrictor housing or regulator housing when the throughflow-quantity regulator or the throughflow restrictor is located in the closed position. Since this annular gap, in the closed position, is closed, undesirable rogue streams are avoided in this region as well.

BRIEF DESCRIPTION OF THE DRAWINGS

Further features according to the invention can be gathered from the claims in conjunction with the drawings and the description. The invention will be described in yet more detail hereinbelow with reference to a preferred exemplary embodiment.

In the drawings.

DETAILED DESCRIPTION OF THE PREFERRED EMBODIMENTS

Figures 1, 2:
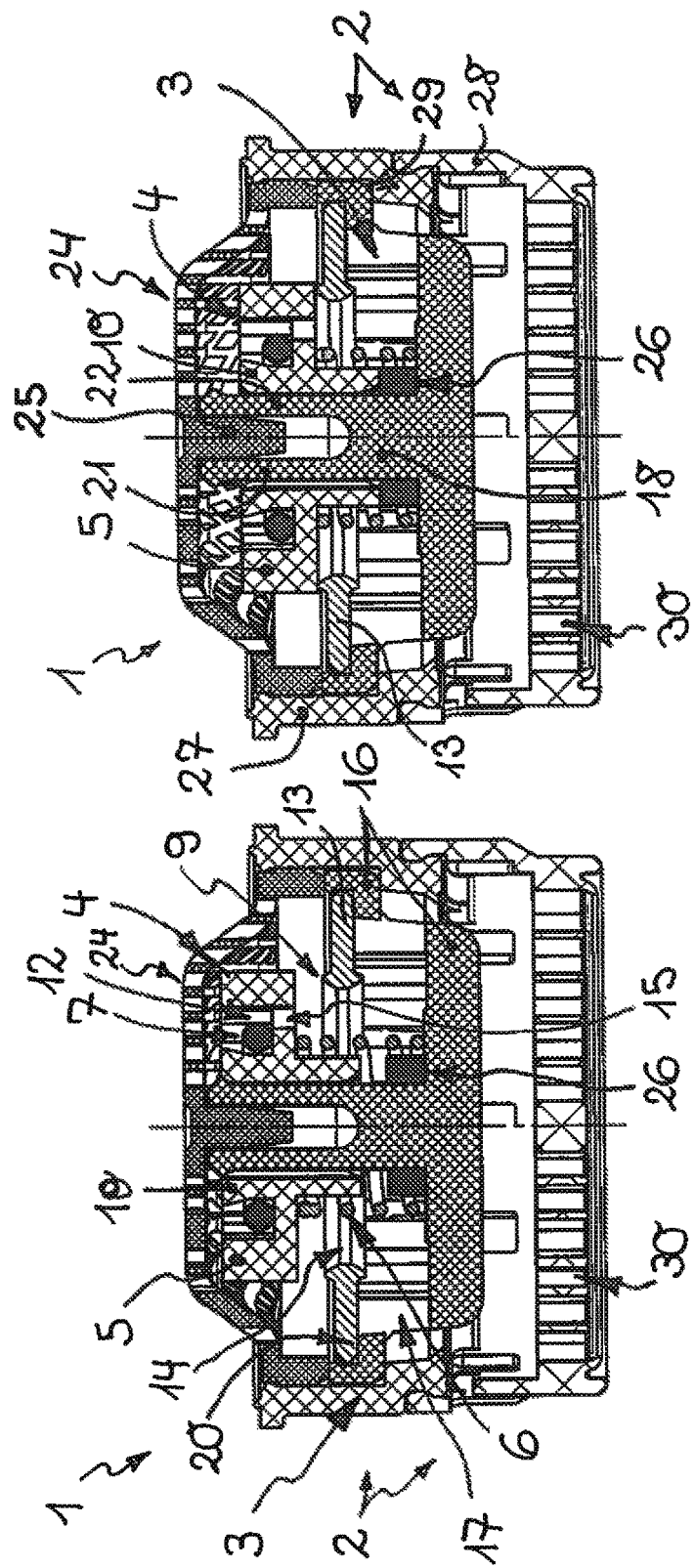
FIG. 1 shows, in longitudinal section, a sanitary outlet element having an inflow-side attachment screen or filter screen and an outflow-side jet regulator, wherein, between the attachment screen or filter screen and the jet regulator, a throughflow-quantity regulator is guided in a displaceable manner in the insert housing of the outlet element, and wherein the throughflow-quantity regulator in FIG. 1 is located in an open position.
FIG. 2 shows the outlet element from FIG. 1, likewise in longitudinal section, wherein the throughflow-quantity regulator here is located in a closed position.
Figure 3:
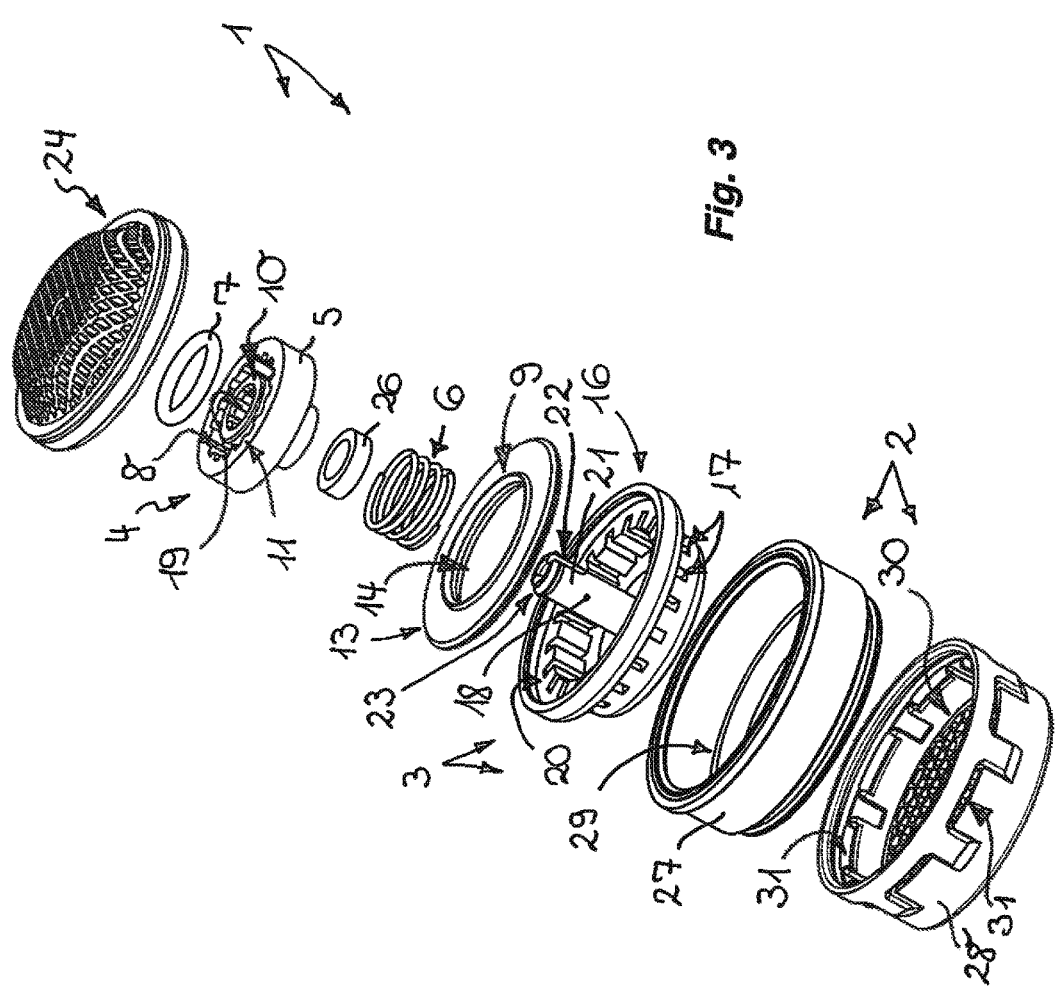
FIG. 3 shows the sanitary outlet element from FIGS. 1 and 2 with the individual parts illustrated in an exploded state.

FIGS. 1 to 3 illustrate a sanitary outlet element 1 which can be inserted, by way of its insert housing 2, into the water outlet of a sanitary outlet fitting (not shown in any more detail here). The outlet element 1 has a jet regulator 3, by means of which the water flowing out of the outlet element 1 can be formed into a homogeneous and, as far as possible, non-splashing water jet. The jet regulator 3 has arranged in front of it a throughflow-quantity regulator 4, by which the quantity of water flowing through per unit of time is adjusted to a set maximum value. The throughflow-quantity regulator 4 is guided in a displaceable manner in the insert housing 2 of the outlet element 1 by way of its regulator housing 5 and can be moved, counter to the restoring force of at least one restoring element 6, from an open position, which is shown in FIG. 1 and in which the regulator housing 5 has at least some of the water which flows through the outlet element 1 flowing around it along its outer side, into the closed position, which is shown in FIG. 2.

In the closed position, which is shown in FIG. 2, the water flowing through the insert housing 2 of the outlet element 1 to the jet regulator 3 can flow through just the throughflow-quantity regulator 4. Whereas it is therefore the case, in the open position according to FIG. 1, that the water pressure has not yet reached a level at which, on the one hand, the restoring force of the at least one restoring element 6 is overcome and, on the other hand, the throughflow-quantity regulator 4 has the task of adjusting the throughflow output down to the set maximum value, such that in the case of a higher water pressure the throughflow-quantity regulator 4 is moved into its closed position, in which the water can pass just through the throughflow-quantity regulator 4 such that the throughflow-quantity regulator 4 can adjust the exiting quantity of water in a functionally appropriate manner to the set maximum value.

Since, by selection of a suitable restoring element 6 with a fixed restoring force, it is also possible to set the water pressure at which the throughflow-quantity regulator 4 is intended to operate in a functionally appropriate manner in the closed position, the outlet element 1 according to the invention can be adjusted particularly well and easily and is distinguished by functionally reliable and stable operation.

The throughflow-quantity regulator 4, which is guided in a displaceable manner in the insert housing 2 of the outlet element 1, has an annular flow-restricting body 7 made of elastic material. The flow-restricting body 7 is arranged in an annular groove 8 in the regulator housing 5 and engages around a central housing core 10. At least one of the circumferential walls delimiting the annular groove 8 bears a regulating profiling 11, into which the elastic flow-restricting body 7 embeds itself to an increasing extent as water pressure increases. In the exemplary embodiment shown here, the regulating profiling 11 is provided on the outer circumferential wall of the annular groove 8. The flow-restricting body 7 delimits, between itself and the at least one circumferential wall bearing the regulating profiling 11, an annular or control gap 12. Since the flow-restricting body 7, as the pressure of the water flowing through the annular or control gap 12 increases, embeds itself into the regulating profiling 11, the annular gap 12 is narrowed to an increasing extent and, even as water pressure increases, it is not possible for the throughflow output to exceed a set maximum value.

FIG. 2 illustrates that, in the closed position, which is shown in FIG. 2, the throughflow-quantity regulator 4 rests, by way of its regulator housing 5, on a support 13 such that a support opening 14 is closed. In the closed position here, the at least one throughflow opening 15 of the throughflow-quantity regulator 4 opens out in the support opening 14.

So that, in the closed position, which is shown in FIG. 2, the throughflow-quantity regulator 4 can close the support opening 14 in a sealed manner by its regulator housing 5, at least one annular seal 9 is provided between the regulator housing 5 and the support 13. The at least one annular seal 9 is integrally formed here on that peripheral region of the support 13 which surrounds the support opening 14.

So that the water flowing through the outlet element 1 can be divided into a multiplicity of individual jets by the jet regulator 3, the jet regulator 3 has a jet divider. The jet divider is designed here in the form of an approximately cup-like diffuser 16 which, in the circumferential wall of its cup shape, has divider openings 17. The water flowing through is intended to be divided up by said divider openings 17 into a corresponding number of individual jets.

The cup base of the cup-like diffuser 16 is designed in the form of a hole-free deflector plate, by which the water flowing in first of all in the longitudinal direction of the regulator housing 5 is deflected radially outward to the side and is guided to the divider openings 17. A guide pin 18 projects on the cup base of the cup-like diffuser 16 and passes through a guide opening 19 in the regulator housing 5. The guide opening 19 passes through the housing core 10 of the throughflow-quantity regulator 4. The diffuser 16, on its inflow-side inner circumference, has a bearing-means mount, on which the support 13 rests. The support mount is designed here in the form of an annular shoulder 20. The support 13, with its central support opening 14, forms an annular disk.

A comparison of FIGS. 1 to 3 clearly shows that the guide pin 18, at its free pin end, bears resilient arms 21, 22, sliding stops 23 being provided on the outside of the resilient arms. The sliding stops 23 delimit the sliding path of the throughflow-quantity regulator 4 in the direction counter to the water flowing through. The resilient arms 21, 22 can be deflected, or moved resiliently, inward in relation to one another, counter to their inherent elasticity, from a functional position into a release position.

The outlet element 1 has an attachment screen or filter screen 24, by which the particles of dirt possibly entrained in the water are prevented from penetrating into the interior of the insert housing 2. The attachment screen or filter screen 24 can be fastened, and in particular latched, preferably in a releasable manner on the insert housing 2. The throughflow-quantity regulator 4 is arranged, and guided in a displaceable manner, in the insert housing 2 between the inflow-side attachment screen or filter screen 24 and the jet divider, designed here in the form of a diffuser 16.

It can clearly be seen in FIGS. 1 and 2 that the attachment screen or filter screen 24 has provided on it a securing pin 25 which, with the attachment screen or filter screen 24 latched on the insert housing 2, projects into a free space remaining between the resilient arms 21, 22 such that the resilient arms 21, 22 are secured against being deflected, or moved resiliently, inwards in relation to one another. This prevents the situation where the restoring element 6, which acts on the throughflow-quantity regulator 4 and is designed preferably in the form of a compression spring and in particular in the form of a helical spring, presses the throughflow-quantity regulator 4 against the attachment screen or filter screen 24 such that the releasable connection between said attachment screen or filter screen 24 and the insert housing 2 is unintentionally released.

It can also be seen in FIGS. 1 and 2 that the cup base of the diffuser 16 and the regulator housing 5 have provided between them a damping ring 26, the guide pin 18 passing through the annular opening of said damping ring, wherein the damping ring 26 delimits the sliding path of the regulator housing 5 in the direction of the jet divider 16.

The insert housing 2 is designed in two parts here and has an inflow-side housing part 27 and an outflow-side housing part 28, which can be latched in a releasable manner to the inflow-side housing part. The diffuser 16 is inserted into the housing part 27, from the inflow side thereof, as far as an annular shoulder 29.

A flow straightener, which has the task of joining the individual jets together again to form a homogeneous overall jet, is provided on that end side of the outflow-side housing part 28 which forms the outflow end surface of the outlet element 1. The flow straightener has a lattice structure, mesh structure or perforated structure. In the case of the exemplary embodiment shown here, the flow straightener is designed in the form of a perforated plate 30, which has a multiplicity of honeycomb-like throughflow holes and is integrally formed on the outflow-side housing part 28.

The jet regulator 3 of the outlet element 1 shown here is designed in the form of a so-called jet aerator, in the case of which the water flowing through is mixed with ambient air. The divider openings 17 of the diffuser 16 are followed, in the flow direction, for this purpose by a cross-sectional narrowing, in which the individual jets coming from the diffuser 16 undergo an increase in speed. This increase in speed gives rise, on the outflow side of the diffuser 16, to a negative pressure, which sucks in ambient air through housing openings 31 provided on the circumference of the insert housing 2.

Instead of the throughflow-quantity regulator 4, it is also possible to provide, in the outlet element 1 illustrated here, a throughflow restrictor, by which the water flowing through per unit of time can be limited to a set value. Such a throughflow restrictor can be designed in the same way as the throughflow-quantity regulator 4 illustrated here, albeit without the elastic flow-restricting body 7.

LIST OF ELEMENT NUMBERS

1 Sanitary outlet element
2 Insert housing
3 Jet regulator
4 Throughflow-quantity regulator
5 Regulator housing
6 Restoring element
7 Flow-restricting body
8 Annular groove
9 Annular seal
10 Housing core
11 Regulating profiling
12 Annular or control gap
13 Support
14 Bearing-means opening
15 Throughflow opening
16 Diffuser
17 Divider opening
18 Guide pin
19 Guide opening
20 Annular shoulder
21 Resilient arm
22 Resilient arm
23 Sliding stops
24 Attachment screen or filter screen
25 Securing pin
26 Damping ring
27 Inflow-side housing part
28 Outflow-side housing part 29 Annular shoulder
30 Perforated plate
31 Aerating opening

The invention claimed is:

1. A sanitary outlet element (1) that is insertable into a water outlet of a sanitary outlet fitting, the sanitary outlet element comprising: an insert housing (2), a jet regulator (3) in the insert housing that shapes an exiting water jet, a throughflow-quantity regulator (4) or a throughflow restrictor arranged in front of the jet regulator, as seen on an inflow side, by which a quantity of water flowing through per unit of time is adjusted or limited to a set value, the throughflow-quantity regulator (4) or the throughflow restrictor including a flow-restrictor housing or regulator housing (5) by which the throughflow-quantity regulator (4) or the throughflow restrictor is guided in a displaceable manner in the insert housing (2) and is movable, counter to a restoring force of at least one restoring element (6), from an open position, in which the flow-restrictor housing or the regulator housing (5) has at least some of the water flowing around it, into a closed position, in which the water flowing to the jet regulator (3) flows through the throughflow-quantity regulator (4) or the throughflow restrictor, the jet regulator (3) includes a jet divider (16), the jet divider comprises a cup-shaped diffuser (16) which, in a circumferential wall thereof, has divider openings (17), by which the water flowing therethrough is divided into a multiplicity of individual jets, a guide pin (18) projects on a cup base of the cup-shaped diffuser (16) and passes through a guide opening (19) in the flow-restrictor housing or the regulator housing (5), and the guide pin (18), at a free end thereof, bears resilient arms (21, 22), and sliding stops (23) for the flow-restrictor housing or regulator housing (5) are provided on an outside of the resilient arms (21, 22), and the resilient arms (21, 22) are inwardly deflectable in relation to one another, counter to an inherent elasticity thereof, from a functional position into a release position.

2. The sanitary outlet element according to claim 1, wherein the throughflow-quantity regulator (4) or the throughflow restrictor is provided and comprises an annular flow-restricting element (7) which is made of elastic material that is arranged in an annular groove (8), formed by two circumferential walls and a groove floor, in the regulator housing (5) and engages around a housing core (10), and at least one of the circumferential walls delimiting the annular groove (8) bears a regulating profiling (11), and the regulator housing (5), in a region of a the groove floor, has at least one throughflow opening (15).

3. The sanitary outlet element according to claim 2, wherein the annular flow-restricting element (7) delimits, between itself and the at least one of the circumferential walls that bears the regulating profiling (11), an annular gap (12), and the annular flow-restricting element (7) embeds itself into the regulating profiling (11) as a pressure of the water flowing through the annular gap (12) increases, such that the annular gap (12) narrows to an increasing extent.

4. The sanitary outlet element according to claim 2, wherein, in the closed position, the throughflow-quantity regulator (4) or the throughflow restrictor rests, by way of the flow-restrictor housing or the regulator housing (5) thereof, on a support (13) and closes a support opening (14) that extends through the support.

5. The sanitary outlet element according to claim 4, wherein, in the closed position, the at least one throughflow opening (15) of the throughflow-quantity regulator (4) opens out in the support opening (14).

6. The sanitary outlet element according to claim 4, wherein at least one annular seal is provided between the flow-restrictor housing or the regulator housing (5) and the support (13).

7. The sanitary outlet element according to claim 6, wherein at least one annular seal is integrally formed on the flow-restrictor housing or the regulator housing (5) or on a peripheral region of the support (13) which surrounds the support opening (14).

8. The sanitary outlet element according to claim 1, wherein the guide opening (19) passes through a core (10) of the regulator housing (5).

9. The sanitary outlet element according to claim 1, further comprising an attachment screen or filter screen (24) fastened on the insert housing (2), and the throughflow-quantity regulator (4) or the throughflow restrictor is arranged, and guided in a displaceable manner, in the insert housing (2) between the jet divider (16) and the attachment screen or filter screen (24).

10. The sanitary outlet element according to claim 9, wherein the attachment screen or filter screen (24) includes a securing pin (25) which, with the attachment screen or filter screen (24) latched on the insert housing (2), projects into a free space remaining between the resilient arms (21, 22) such that the resilient arms (21, 22) are secured in the functional position thereof.

11. The sanitary outlet element according claim 1, wherein the at least one restoring element (6) is a restoring spring or compression spring.

12. A sanitary outlet element (1) that is insertable into a water outlet of a sanitary outlet fitting, the sanitary outlet element comprising: an insert housing (2), having an inflow-side housing part (27) and an outflow-side housing part (28), a jet regulator (3) in the insert housing that shapes an existing water jet, a throughflow-quantity regulator (4) or a throughflow restrictor arranged in front of the jet regulator, as seen on an inflow side, by which a quantity of water flowing through per unit of time is adjusted or limited to a set value, a filter screen (24) arrainged in front of the throughflow-quantity regulator (4) or the throughflow restrictor, as seen on an inflow side, the throughflow-quantity regulator (4) or the throughflow restrictor including a flow-restrictor housing or regulator housing (5) by which the throughflow-quantity regulator (4) or the throughflow restrictor is guided in a displaceable manner in the insert housing (2) and is movable, counter to a restoring force of at least one restoring element (6), from an open position, in which the flow-restrictor housing or the regulator housing (5) has at least some of the water flowing around it, into a closed position, in which the water flowing to the jet regulator (3) flows through the throughflow-quantity regulator (4) or the throughflow restrictor, the jet regulator (3) includes a jet divider (16), the jet divider comprises a cup-shaped diffuser (16) which, in a circumferential wall thereof, has divider openings (17), by which the water flowing therethrough is divided into a multiplicity of individual jets, a guide pin (18) projects on a cup base of the cup-shaped diffuser (16) and passes through a guide opening (19) in the flow-restrictor housing or the regulator housing (5), the guide opening (19) passes through a core (10) of the regulator housing (5), and wherein, in the closed position, the throughflow-quantity regulator (4) or the throughflow restrictor rests, by way of the flow-restrictor housing or the regulator housing (5) thereof, on a support (13) which is formed as a separate part and closes a support opening (14) that extends through the support, and the cup-shaped diffuser (16), on an inflow-side inner circumference thereof, includes a support mount, on which the support (13) rests, the filter screen (24) being separately supported on the inflow-side housing part (27) and does not engage the support (13).

13. The sanitary outlet element according to claim 12, wherein the support mount is an annular shoulder (20).

14. The sanitary outlet element according to claim 12, wherein the support (13) is an annular disc.

15. The sanitary outlet element according to claim 12, wherein the support (13) includes an axially extending annular seal (9) on an inner periphery thereof.

16. A sanitary outlet element (1) that is insertable into a water outlet of a sanitary outlet fitting, the sanitary outlet element comprising: an insert housing (2), a jet regulator (3) in the insert housing that shapes an exiting water jet, a throughflow-quantity regulator (4) or a throughflow restrictor arranged in front of the jet regulator, as seen on an inflow side, by which a quantity of water flowing through per unit of time is adjusted or limited to a set value, the throughflow-quantity regulator (4) or the throughflow restrictor including a flow-restrictor housing or regulator housing (5) by which the throughflow-quantity regulator (4) or the throughflow restrictor is guided in a displaceable manner in the insert housing (2) and is movable, counter to a restoring force of at least one restoring element (6), from an open position, in which the flow-restrictor housing or the regulator housing (5) has at least some of the water flowing around it, into a closed position, in which the water flowing to the jet regulator (3) flows through the throughflow-quantity regulator (4) or the throughflow restrictor, the jet regulator (3) includes a jet divider (16), the jet divider comprises a cup-shaped diffuser (16) which, in a circumferential wall thereof, has divider openings (17), by which the water flowing therethrough is divided into a multiplicity of individual jets, a guide pin (18) projects on a cup base of the cup-shaped diffuser (16) and passes through a guide opening (19) in the flow-restrictor housing or the regulator housing (5), and the cup base of the diffuser (16) and the regulator housing (5) have provided between them a damping ring (26), the guide pin (18) passing through an annular opening of said damping ring, and the damping ring (26) delimits the sliding path of the flow-restrictor housing or the regulator housing (5) in a direction of the jet divider (16).

* * * * *